United States Patent
Sasahara et al.

(10) Patent No.: US 7,534,465 B2
(45) Date of Patent: May 19, 2009

(54) FUEL CELL ASSEMBLY AND METHOD FOR BONDING A SEPARATOR AND AN ELECTROLYTE LAYER OF A FUEL CELL ASSEMBLY

(75) Inventors: Jun Sasahara, Kawagoe (JP); Toshifumi Suzuki, Fuchu (JP); Tadahiro Kubota, Asaka (JP); Nariaki Kuriyama, Fujimi (JP); Yuji Saito, Narima (JP)

(73) Assignee: Honda Motor Co., Ltd, Tokyo (JP)

( * ) Notice: Subject to any disclaimer, the term of this patent is extended or adjusted under 35 U.S.C. 154(b) by 693 days.

(21) Appl. No.: 10/985,085

(22) Filed: Nov. 4, 2004

(65) Prior Publication Data

US 2005/0175882 A1     Aug. 11, 2005

Related U.S. Application Data

(63) Continuation of application No. PCT/JP03/05632, filed on May 2, 2003.

(60) Provisional application No. 60/379,524, filed on May 9, 2002.

(51) Int. Cl.
    *H01M 8/02*     (2006.01)
    *H01M 2/08*     (2006.01)
    *B05D 5/12*     (2006.01)

(52) U.S. Cl. .................... 427/115; 429/36; 429/38

(58) Field of Classification Search ........... 429/36, 429/38; 427/115
See application file for complete search history.

(56) References Cited

U.S. PATENT DOCUMENTS

| 5,362,579 | A | * | 11/1994 | Rossoll et al. | 429/162 |
| 6,096,451 | A | | 8/2000 | Shiratori et al. | 429/36 |
| 2002/0182479 | A1 | * | 12/2002 | Mallari et al. | 429/44 |

FOREIGN PATENT DOCUMENTS

| EP | 0277539 | | 8/1988 |
| EP | 0918362 | | 5/1999 |
| JP | 55056373 | | 4/1980 |
| JP | 04298967 | | 10/1992 |
| JP | 08255616 | | 3/1995 |
| JP | 07153479 | | 6/1995 |
| WO | WO 0195405 A2 | * | 12/2001 |
| WO | WO 03011794 A1 | * | 2/2003 |

OTHER PUBLICATIONS

R. Chabicovsky et al., "Investigation of a laser soldering process for the interconnection of thin film sensors with sputtered multilayer metallizations," 8257a Journal of Vacuum Science & Technology A, 11 (1993) Jul./Aug., No. 4, Part I, New York, US.

* cited by examiner

*Primary Examiner*—Gregg Cantelmo
(74) *Attorney, Agent, or Firm*—Lumen Patent Firm

(57) ABSTRACT

In a fuel cell assembly (1) comprising an electrolyte layer (2) having a frame (21) and an electrolyte (22) retained in the frame, a pair of separators (5, 6) are bonded to the electrolyte layer by that a metallic material (27) is deposited on one of the frame and each separator and a laser beam is irradiated onto the metallic material through the frame or the separator in a state that the frame and each separator contact each other whereby the metallic material forms a eutectic with the other of the frame and each separator.

7 Claims, 4 Drawing Sheets

FUEL CELL ASSEMBLY AND METHOD FOR BONDING A SEPARATOR AND AN ELECTROLYTE LAYER OF A FUEL CELL ASSEMBLY

CROSS REFERENCE TO RELATED APPLICATIONS

This application is a continuation of international application PCT/JP03/05632, filed on May 2, 2003. International application PCT/JP03/05632 claims the benefit of U.S. provisional application 60/379,524, filed on May 9, 2002.

TECHNICAL FIELD

The present invention relates to a fuel cell assembly and a method for bonding a separator and an electrolyte layer of a fuel cell assembly. Particularly, the present invention relates to a fuel cell assembly comprising an electrolyte layer having an electrolyte retained in a through-hole formed in a frame, and a method for bonding a separator and an electrolyte layer of such a fuel cell assembly.

BACKGROUND OF THE INVENTION

A fuel cell comprises an electrolyte layer and a pair of catalyst carrying electrodes (referred to as catalyst electrode layers) placed on either side of the electrolyte layer, and generates electricity through an electrochemical reaction between fuel fluid such as hydrogen or alcohol and oxidizer fluid such as oxygen or air, which are supplied to the corresponding catalyst electrode layers, with the aid of the catalyst. Depending on the electrolytic material used for the electrolyte layer, the fuel cell may be called as the phosphoric acid type, solid polymer type or molten carbonate type.

In particular, the solid polymer electrolyte (SPE) type fuel cell using an ion conducting resin membrane for the electrolyte layer is considered to be highly promising because of the possibility of compact design, low operating temperature (100° C. or lower), and high efficiency. The electrolyte layer and the catalyst electrode layers disposed thereon are sometimes referred to as a membrane-electrode assembly (MEA).

Typically, such a fuel cell further comprises a pair of diffusion layers placed on either side of the MEA and a pair of separators (or distribution plates) disposed on either outer side of the diffusion layers. The separators can be formed by etching a silicon substrate, for example, and formed with channels (or recesses) for defining a flow passage for a fuel fluid (e.g., hydrogen gas) or an oxidizer fluid (e.g., oxygen gas) in their surface facing the diffusion layers. The diffusion layers are provided to diffuse the fluids evenly over the catalyst electrode layers as well as to contact the catalyst electrode layers to thereby transmit electric potential of the electrode layers to outside, and typically formed of an electroconductive porous material such as a carbon paper or a carbon cloth. The combination of a catalyst electrode layer and a diffusion layer may be called a diffusion layer. Further, in order to prevent undesirable leakage of the fluids, seal members are disposed between the electrolyte layer and the separators so as to surround the diffusion layers. A fuel cell assembly is formed by stacking these component parts and thereafter applying a tightening force on them in the stacking direction by using a tightening structure comprising backing plates disposed on either outer side of the separators, for example, so that the adjacent component parts are closely pressed to each other. In order to prevent leakage of the fluids through an interface between the separator and the diffusion layer or prevent the increase in the contact resistance between the diffusion layer and the catalyst electrode layer while keeping an undesirably large pressure from being applied to each component part of the fuel cell assembly, the externally applied tightening pressure need be maintained at a suitable level.

The electrolyte may consist of a solid polymer electrolyte (SPE). However, the SPE can function as an ion conducting membrane only when impregnated with water, and the SPE when impregnated with water significantly increases its volume. The volume of the SPE can also change depending on the temperature. Such volume increase of the SPE can generate stress inside the fuel cell assembly 1. Therefore, when the externally applied tightening force is large, the pressure applied to the component parts may become excessively high, which can cause a problem such as breaking the seal members 17, 18. Controlling the pressure at a constant level would result in an undesirably complicated operation. Also, the large tightening force tends to necessitate a bulky tightening structure for generating such a force, which would increase the weight and volume of the fuel cell assembly.

In order to solve these problems, it is proposed in International Publication WO01/95405 to provide a fuel cell assembly comprising: an electrolyte layer having a grid frame provided with a plurality of through-holes that can be formed by etching a silicon substrate, for example, and electrolyte retained in the through-holes; and a pair of separators interposing the electrolyte layer therebetween, wherein the electrolyte is aligned with fluid passages (recesses) defined by the separators. In this fuel cell assembly, the electrolyte retained in the through-holes of the frames can bulge into the fluid passages, and thus the increase in the pressure between the component parts of the fuel cell assembly due to the expansion of the electrolyte can be significantly reduced.

The above publication also discloses to bond the grid frame and the separators by using an adhesive agent or anodic bonding, for example. In the anodic bonding, an electrode layer and a glass layer are formed on the surface of the grid frame to be bonded, and a similar electrode layer is formed on a surface of the separators to be bonded. Then, the grid frame and the separators are brought into close contact to each other and heated to about 400° C., at which sodium ions become highly mobile. In this state, a voltage is applied to the electrode layers so as to move ions. Since the solid electrolyte is weak to high temperature and could be damaged if heated to the temperature of 400° C., a heater is placed under the electrode layers of the grid frame and/or the separators to allow localized heating. The heaters may consist of polycrystalline silicon, for example.

However, such provision of heaters complicates the structure, and increases the manufacturing steps. The bonding strength achieved by adhesive agents can significantly decrease when water is generated and humidity is increased in an operating state of the fuel cell assembly, and thus it is difficult to maintain a sufficient bonding strength for an extended period of time.

BRIEF SUMMARY OF THE INVENTION

In view of such problems of the prior art, a primary object of the present invention is to provide a fuel cell assembly that can bond an electrolyte layer (or MEA) and separators with a sufficient strength without complicating the structure and without concern about damaging electrolyte of the electrolyte layer.

A second object of the present invention is to provide a method for bonding an electrolyte layer and a separator of such a fuel cell assembly.

According to one aspect of the present invention, such objects can be achieved by providing a fuel cell assembly (1), comprising: an electrolyte layer (2); a pair of catalyst electrode layers (3a, 3b) interposing the electrolyte layer therebetween; and a pair of separators (5, 6) disposed on either outer side of the pair of catalyst electrode layers, each of the separators being formed with a recess (51, 52) in a surface facing an associated one of the catalyst electrode layers so that a fuel fluid or an oxidizer fluid can flow through the recess to contact the associated catalyst electrode layer, wherein the electrolyte layer comprises a frame (21) and an electrolyte (22) retained in the frame, and wherein each of the separators is bonded to the frame via a metallic material (27) deposited on a peripheral portion of one of the frame and the separator and forming a eutectic (29) with the other of the frame and the separator. Preferably, the metallic material is deposited on the peripheral portion of the frame and forms the eutectic with the separator. Such a eutectic bond can be formed by making the frame and the separator contact each other with the metallic material interposed therebetween, and irradiating radiation energy onto the metallic material through the frame or separator, and therefore, unlike the anodic bonding, does not need additional heaters or electrodes, thus simplifying the structure. Further, the eutectic bond can provide a high bonding strength, making it possible to bond the separator and the frame of the electrolyte layer with a small area but with sufficient strength that can ensure reliable sealing even if the internal pressure is increased in an operating state of the fuel cell assembly. This can reduce the area of peripheral portion of the separator and the electrolyte layer (frame), to thereby minimize the weight and volume of the fuel cell assembly. The seal members disposed between the separator and the frame also become unnecessary. Irradiation of the laser beam can locally heat the metallic material on the frame or the separator, and therefore, excessive heating of the frame and the electrolyte retained therein, and resulting damage to the electrolyte can be avoided.

In one embodiment, both of the separators and the frame are each made of a silicon substrate. In such a case, it is preferable if a silicon nitride film is formed at least on the peripheral portion of the one of the frame and the separator such that the metallic material is deposited on the silicon nitride film because this can prevent undesired short circuit at the peripheral (seal) potion. The metallic material preferably comprises a low-melting point metal such as gold, copper and aluminum.

According to another aspect of the present invention, there is provided a method for bonding a separator (5, 6) and an electrolyte layer (2) of a fuel cell assembly (1), wherein the electrolyte layer comprises a frame (21) and an electrolyte (22) retained in the frame, comprising the steps of: depositing a metallic material (27) on one of the frame and the separator; and irradiating radiation energy onto the metallic material through the frame or the separator in a state that the frame and the separator contact each other with the metallic material being disposed therebetween to thereby form a eutectic (29) of the metallic material and the other of the frame and the separator. Preferably, the metallic material is deposited on the frame and forms the eutectic with the separator.

Thus, because the frame and the separator can be bonded with the eutectic formed by irradiating radiation energy (laser) onto the metallic material, unlike the anodic bonding, there is no need for additional heaters or electrodes, thus simplifying the structure and minimizing the manufacturing cost. Further, the eutectic bond can provide a high bonding strength, making it possible to bond the separator and the frame of the electrolyte layer with a small area but with sufficient strength that can ensure reliable sealing even if the internal pressure is increased in an operating state of the fuel cell assembly. This can reduce the area of peripheral portion of the separator and the electrolyte layer (frame), to thereby minimize the weight and volume of the fuel cell assembly. The seal members disposed between the separator and the frame also become unnecessary. Irradiation of the laser beam can locally heat the metallic material on the frame or the separator, and therefore, excessive heating of the frame and the electrolyte retained therein, and resulting damage to the electrolyte can be avoided.

Preferably, the separator and the frame are each made of a silicon substrate. In such a case, it is preferable that the method further comprises the step of forming a silicon nitride film (25) on a surface of the peripheral portion of the one of the frame and the separator such that the metallic material is deposited on the silicon nitride film. Also in such a case, the radiation energy can preferably be $CO_2$ laser beam because it has a favorable transmission property for a silicon substrate having a typical thickness (e.g., 50-500 μm).

Further preferably, the step of irradiating radiation energy comprises the step of cooling the frame or the separator. This can prevent excessive temperature increase of the electrolyte retained in the frame even more reliably.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
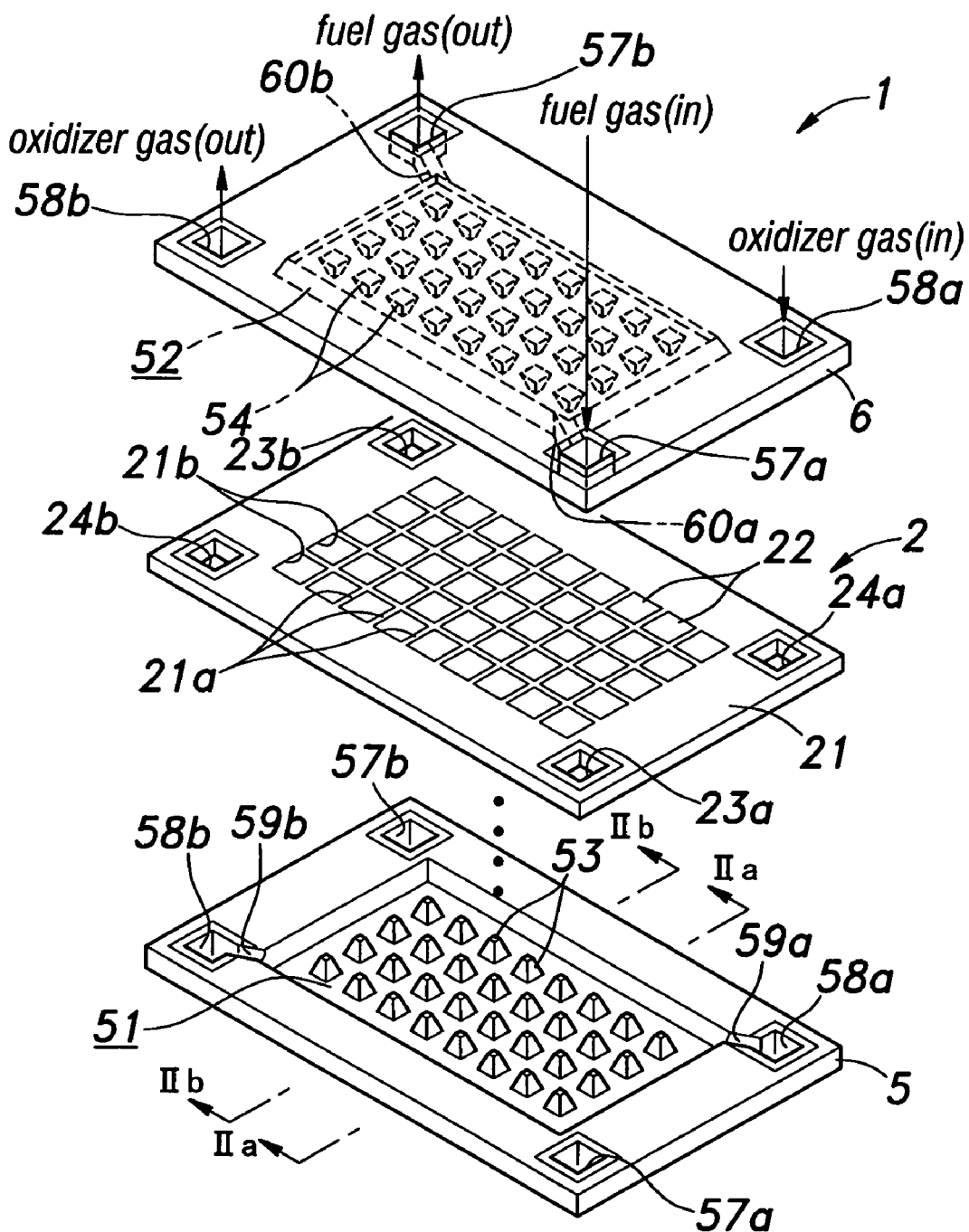
FIG. 1 is an exploded perspective view showing an embodiment of a fuel cell assembly to which the present invention is applied.

FIG. 1 is an exploded perspective view showing an embodiment of a fuel cell assembly to which the present invention is applied. The fuel cell assembly 1 comprises a centrally disposed electrolyte layer 2, and a pair of separators 5, 6 placed on either side of the electrolyte layer 2. Each separator 5, 6 is formed with a recess 51, 52 in a surface facing the electrolyte layer 2 (can be called a first surface). The recesses 51, 52 serve as flow passages for a fuel fluid (e.g., H2) and oxidizer fluid (e.g., O2), wherein the fluids are typically gases.

The electrolyte layer 2 comprises a grid frame 21 having a plurality of bars 21 which are intersecting each other, and solid polymer electrolyte (SPE) 22 which is filled into rectangular through-holes 21b defined between adjacent bars 21a of the grid frame 21. The SPE 22 may be made from such materials as perfluorocarbonsulfonic acid (Nafion: tradename), phenolsulfonic acid, polyethylenesulfonic acid, polytrifluorosulfonic acid, and so on.

The grid frame 21 is preferably formed by processing a silicon substrate by etching, etc., and comprises a rectangular and annular peripheral (or fringe) portion and a rectangular grid area defined inside the annular peripheral portion.

Figure 2A:
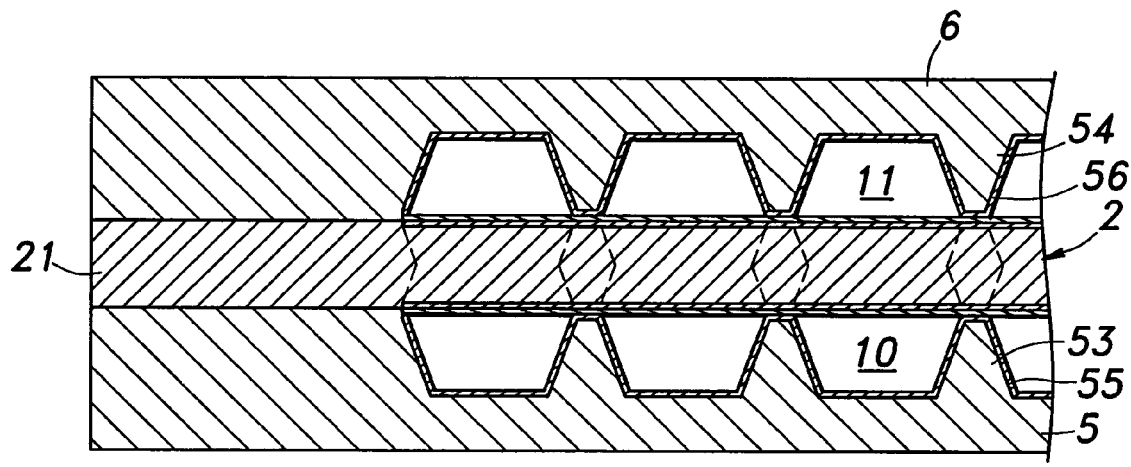
FIGS. 2a and 2b are partial cross-sectional view taken along the lines IIa-IIa and IIb-IIb in FIG. 1, respectively.
Figure 2B:
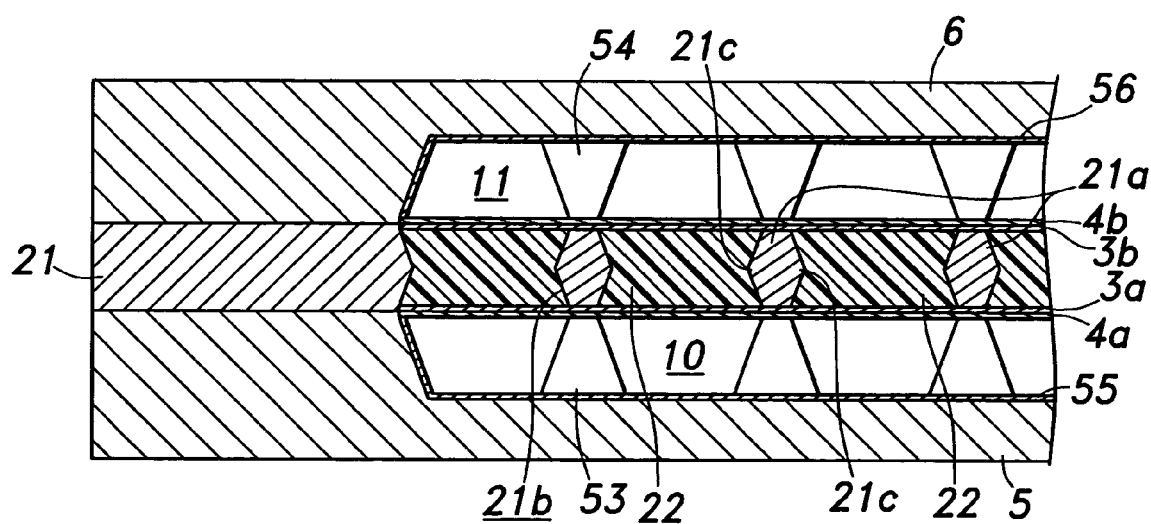

As shown in the cross-sectional view in FIGS. 2a and 2b, each bar 21a in the grid area of the grid frame 21 is provided with a projection 21c so as to project into an intermediate part of the corresponding through-hole 21b. The projection 21c is in the shape of a ridge extending along the length of the bar 21a, and produces a narrower middle part in each through-hole 21b. The projection 21c helps to retain the SPE 22 in each through hole 21b. Such a projection 21c can be easily conveniently formed at the same time as forming the grid frame 21 from a silicon substrate by conducting anisotropic etching (wet etching) on both sides of the silicon substrate.

Further, a pair of catalyst electrode layer 3a, 3b containing catalyst such as platinum on either side of the grid area of the grid frame 21 to form a membrane-electrode assembly (MEA). The catalyst electrode layers 3a, 3b can be formed by printing (or transferring) catalyst-carrying carbon onto the surfaces of the electrolyte layer 2, for example. Preferably, a pair of diffusion layers 4a, 4b are placed between the catalyst electrode layers 3a, 3b and the separators 5, 6, respectively. It is also possible to integrate the catalyst electrode layers 3a, 3b and the diffusion layers 4a, 4b, respectively, to form diffusion electrodes.

In this embodiment, a rectangular through hole 23a, 23b, 24a and 24b is formed in each corner portion of the peripheral portion of the grid frame 21. One of the diagonally opposing pairs of these through holes 23a and 23b serve as inlet and outlet for the fuel gas. The remaining opposing pair of these through holes 24a and 24b serve as inlet and outlet for the oxidizing gas. These holes are formed by anisotropic etching (wet etching), and are therefore formed as rectangular holes as was the case with the through holes 21b of the grid frame 21. They may also be formed by dry etching, and in this case, may have any desired shape.

Each separator 5, 6 is also formed by working a silicon substrate, and has a substantially conformal rectangular shape. A recess 51, 52 having a flat bottom is formed centrally in a surface of each separator 5, 6 and a plurality of projections 53, 54 each having the shape of a truncated pyramid are formed on the flat bottom. As shown in FIGS. 2a, 2b, the bottom of the recesses 51, 52 and the surface of the projections 53, 54 are coated with electrode terminal layers 55, 56, each of which can consist of a gold (Au) film, for example, and may be formed by any known film forming process, for electrically connecting the catalyst electrode layers 3 and 4 to an external circuit.

The projections 53, 54 in the recesses 51, 52 of the separators 5, 6 are located so as to align with the bars 21a of the grid frame 21 and are electrically connected to the intervening catalyst electrode layers 3a, 3b and the diffusion layers 4a, 4b. According to such a structure, the projections 53, 54 do not hinder the expansion of the SPE 22 impregnated with water in an operating state and the SPE 22 is allowed to bulge into recesses 51, 52 of the separators 5, 6. This can reduce affect of the expansion of the SPE22 on the pressure imposed on the component parts of the fuel cell assembly 1.

Referring to FIG. 1 again, a rectangular through hole 57a, 57b, 58a or 58b is formed in each corner portion of the peripheral portion of each separator 5, 6 so as to align with an associated one of the four through-holes 23a, 23b, 24a, 24b formed in the corners of the grid frame 21. One of the diagonally opposing pairs of the through holes 57a and 57b serve as inlet and outlet for the fuel gas. The remaining opposing pair of the through holes 58a and 58b serve as inlet and outlet for the oxidizing gas. In this embodiment, grooves 59a and 59b formed in the peripheral portion communicate the recess 51 of the lower separator 5 with the through holes 58a and 58b for the oxidizing gas, and similar grooves 60a and 60b communicate the recess 52 in the upper separator 6 with the through holes 57a and 57b for the fuel gas. These grooves 59a, 59b, 60a, and 60b are formed by anisotropic etching (wet etching), and are therefore each provided with a V-shaped cross section. The through holes 57a, 57b, 58a and 58b are also each provided with a rectangular shape as they are formed by anisotropic etching (wet etching), but may be given with any desired shape if they are formed by dry etching, for example.

When the fuel cell assembly 1 is used independently, the through-holes 23a, 23b of the grid frame 21 aligned with the fuel gas through-holes 57a, 57b of the upper separator 6 and/or the through-holes 57a, 57b of the lower separator 5 are closed. However, when another fuel cell assembly is connected to the underside of the fuel cell assembly 1 to form a fuel cell stack, the fuel gas can flow to the another fuel cell assembly through the through-holes 23a, 23b, 57a, 57b. Similarly, when the fuel cell assembly 1 is used independently, the through-holes 58a, 58b of the lower separator 5 are closed at the underside of the of the separator 5, but when another fuel cell assembly is connected to the underside of the fuel cell assembly 1 to form a fuel cell stack, the oxidizing gas can flow to the another fuel cell assembly through the through-holes 58a, 58b.

In the state that the pair of separators 5, 6 are placed on either side of the electrolyte layer 2 with the catalyst electrode layers 3a, 3b and the diffusion layers 4a, 4b interposed therebetween, the peripheral portion of the electrolyte layer 2 (more specifically, the frame 21 thereof) and the peripheral portion of the separators 5, 6 are bonded to air-tightly seal the space (fluid passage) defined by the recess 51 of the separators 5, 6 and the electrolyte layer 2.

Figure 3A:
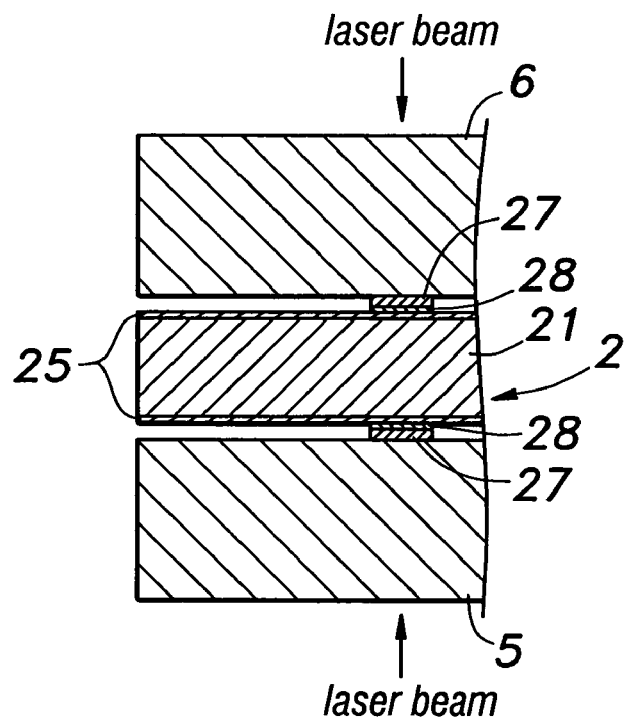
FIGS. 3a and 3b are partial cross-sectional view showing a preferred method for bonding an electrolyte layer and a separator according to the present invention.
Figure 3B:
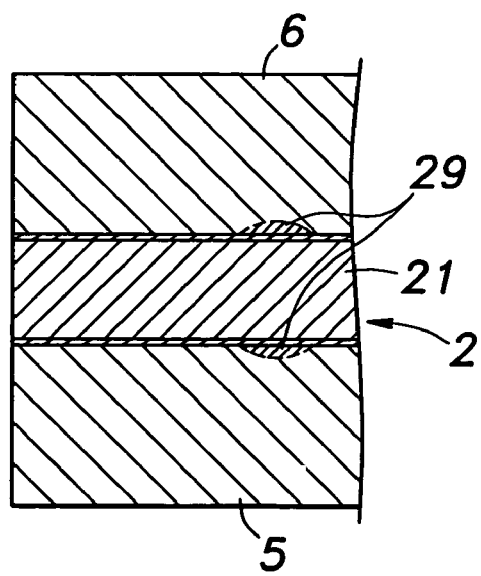

Now, referring to FIGS. 3a and 3b, a method for bonding the electrolyte layer 2 and the separators 5, 6 according to the present invention is described. In this embodiment, the separators 5, 6 and the frame 21 of the electrolyte layer 2 are each formed of a silicon substrate, and a silicon nitride film 25 is formed on the surface of the peripheral portion of the frame 21 by sputtering or the like. The silicon nitride film 25 can prevent undesired short-circuit at the peripheral portion (or seal portion).

As shown in FIG. 3a, before bonding the electrolyte layer 2 and the separators 5, 6, a seal metal layer 27 comprising a low-melting point metal such as gold (Au) is formed on either side of the peripheral portion of the grid frame 21 by physical vapor deposition (such as resistive heating deposition). Instead of gold, other low-melting point metal such as copper (Cu) or aluminum (Al) may be used. Further, instead of physical vapor deposition, other film forming method such as chemical vapor deposition (CVD), spin coating, sputtering or screen printing may be used. Preferably, a titanium (Ti) layer 28 is formed between the silicon nitride film 25 and the seal metal layer 27 by vapor deposition or the like in order to improve the contact between the silicon nitride film 25 and the seal metal layer 27. Titanium may be substituted by aluminum (Al), nickel (Ni), chromium (Cr), etc.

Figure 4:
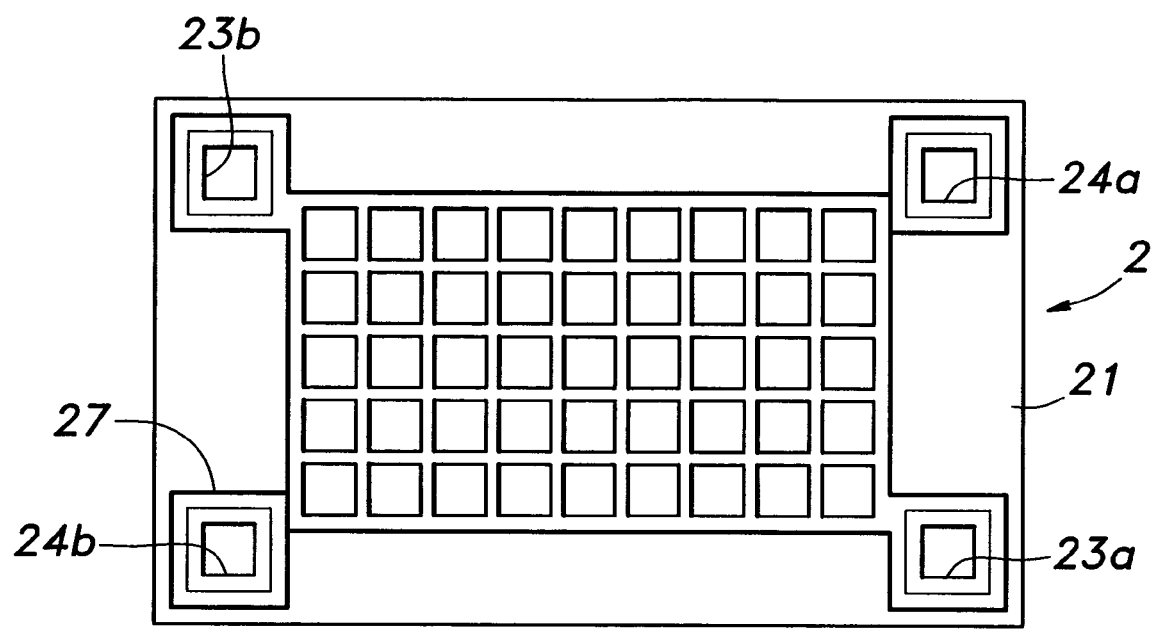
FIG. 4 is a plan view showing a seal metal layer pattern formed on the electrolyte layer.

As seen in the plan view of FIG. 4, the seal metal layer 27 is formed so as to surround the grid area and the through-holes 23a, 23b, 24a, 24b of the grid frame 21 of the electrolyte layer 2. Such a patterning of the seal metal 27 can be achieved by a known method such as etching or lift-off.

In the bonding process, the electrolyte layer 2 formed with the seal metal layer 27 on its either side is placed between the separators 5, 6, and then, with a small pressure applied thereon, a laser beam serving as a radiation energy is irradiated onto the seal metal layer 27 through the separators 5, 6. In this step, the laser beam is preferably scanned along the pattern of the seal metal layer 27. The laser beam irradiation may be conducted simultaneously on both sides of the electrolyte layer 2 or may be conducted separately. Also it may be possible to irradiate the laser beam through the frame 21 instead of through the separators 5, 6. The laser beam is selected so as to be able to pass through the separators 5, 6 or frame 21 with sufficient transmission. For example, when the separator 5, 6 or the frame 21 consists of a silicon substrate having a thickness of about 50-500 μm, a $CO_2$ laser beam having a wavelength of about 10.6 μm can be preferably used.

By irradiating the laser beam, it is possible to selectively heat the seal metal layer 7 and promote alloying of the silicon of the separators 5, 6 and the gold of the seal metal layer 27, to thereby form eutectic portions 29. In this way, the grid frame 21 of the electrolyte layer 2 and the separators 5, 6 are bonded together. It should be noted that instead of the laser beam, it is conceivable to use other radiation energy such as ultrasonic wave. However, in view of favorable transmission through the separators 5, 6 or the frame 21, and an ability of heating the seal metal layer locally, laser beam is preferred.

Thus, because the seal metal layer 27 is heated locally, excessive temperature increase of the electrolyte 22 of the electrolyte layer 2 can be avoided. Further, the eutectic bond can provide a high bonding strength (for example, 40 MPa for Si/Au/Si structure), whereby making it possible to bond the separators 5, 6 and the electrolyte layer 2 with a small area but with sufficient strength that can ensure reliable sealing even if the internal pressure is increased in an operating state of the fuel cell assembly 1. This can reduce the area of peripheral portion of the separators 5, 6 and the electrolyte layer 2, to thereby minimize the weight and volume of the fuel cell assembly 1. It should be also noted that unlike the anodic bonding, the heaters and electrodes are not necessary, and therefore, it is avoided to complicate the structure of the fuel cell assembly.

Figure 5:
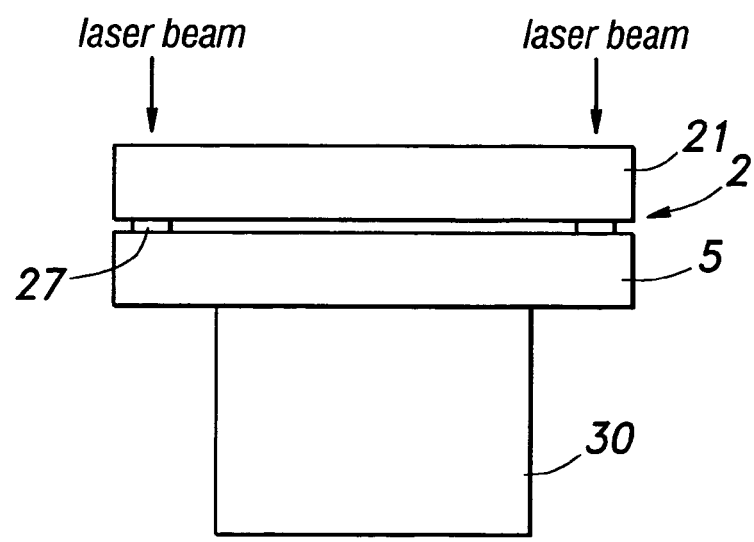
FIG. 5 is a cross-sectional view showing a preferred method for bonding an electrolyte layer and a separator according to the present invention.

In order to prevent the excessive temperature increase of the electrolyte 22 of the electrolyte layer 22 due to the radiation of the laser beam more reliably, the separators 5, 6 and/or the electrolyte layer 2 may be cooled. This can be achieved by contacting a metallic block 30 to the separators 5, 6 and/or the electrolyte layer 2, as shown in FIG. 5. Alternatively or in addition, water cooling may be conducted.

In one example, the separators 5, 6 each have a thickness of about 200 μm, the frame 21 of the electrolyte layer 2 has a thickness of about 100 μm, the silicon nitride film 25 has a thickness of about 0.5 μm, the titanium layer 28 has a thickness of about 0.2 μm, and the seal metal layer 27 has a thickness of about 1 μm and a line width of about 400 μm. In such an example, $CO_2$ laser having a power of about 50 W and a diameter of about 100 μm can be preferably used with a scanning rate of about 20 mm/min.

Although the present invention has been described in terms of a preferred embodiment thereof, it is obvious to a person skilled in the art that various alterations and modifications are possible without departing from the scope of the present invention which is set forth in the appended claims. For example, though in the above embodiment the seal metal (or metallic material) was deposited on the frame of the electrolyte layer, it is also possible to deposit the seal metal on the separator and expose the surface of the frame without coating the silicon nitride film so that the frame and the seal metal form the eutectic. Further, when the diffusion layer is thick, a shim may be provided between the grid frame and the separator. In such a case, the shim may be regarded as a part of the grid frame or the separator. Alternatively, the grid frame and/or separator may be processed by etching or the like so as to absorb the thickness of the diffusion layer. Further, the grid frame and/or separator can be formed of a substrate consisting of an inorganic material other than silicon, that has a high resistance or insulating capacity, such as glass or alumina.

INDUSTRIAL APPLICABILITY

As described above, according to the present invention, an electrolyte layer of a fuel cell assembly comprises a frame and an electrolyte retained in the frame, and the electrolyte layer is bonded to a separator by irradiating radiation energy (laser beam) through the frame or separator onto a metallic material deposited on the frame in a state that the frame and the separator contact each other to thereby form a eutectic of the metallic material and the separator. Therefore, unlike the anodic bonding, there is no need for heaters and electrodes, and thus it is possible to bond the electrolyte layer and the separator by a simple structure and process. The laser beam is selectively absorbed by the metallic material on the frame, and therefore, excessive heating of the frame and the electrolyte retained therein can be avoided.

The invention claimed is:

1. A method for bonding a separator and an electrolyte layer of a fuel cell assembly, wherein said electrolyte layer comprises a frame and an electrolyte retained in said frame, the method comprising:
   depositing a metallic material on a peripheral portion of one of said frame and said separator;
   disposing said frame and said separator such that said frame and said separator contact each other with said metallic material disposed therebetween; and
   irradiating radiation energy onto said metallic material through said frame or said separator to thereby form a eutectic of said metallic material and the other of said frame and said separator;
   wherein said separator and said frame are each made of a substrate consisting of an inorganic material;
   wherein said frame or said separator through which said radiation energy passes is sufficiently transparent to said radiation energy to enable said eutectic to be formed.

2. A method according to claim 1, wherein said radiation energy is a laser beam.

3. A method according to claim 1, wherein said metallic material is deposited on said frame and forms said eutectic with said separator.

4. A method according to claim 1, wherein said substrate comprises silicon.

5. A method according to claim 4, further comprising forming a silicon nitride film on a surface of said peripheral portion of said one of said frame and said separator such that said metallic material is deposited on said silicon nitride film.

6. A method according to claim 4, wherein said radiation energy is a $CO_2$ laser beam.

7. A method according to claim 1, wherein said step of irradiating radiation energy comprises the step of cooling said frame or said separator.

* * * * *